United States Patent [19]
Ogawa et al.

[11] Patent Number: 6,041,461
[45] Date of Patent: *Mar. 28, 2000

[54] SPIKE FOR BASEBALL SHOES

[75] Inventors: Masao Ogawa; Katsumi Shinjo; Hiroshi Nakayama, all of Osaka, Japan

[73] Assignees: Yugenkaisha Shinjo Seisakusho; Yugenkaisha Maruzen Byora, both of Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/028,757

[22] Filed: Feb. 25, 1998

[51] Int. Cl.[7] ...................................... A43C 15/00
[52] U.S. Cl. .................. 12/146 R; 12/142 P; 36/134; 36/67 R
[58] Field of Search ........................... 36/134, 126, 67 R, 36/67 A, 67 B; 12/146 R, 142 P

[56] References Cited

U.S. PATENT DOCUMENTS

| | | | |
|---|---|---|---|
| 1,596,600 | 8/1926 | Dickson | 36/67 R |
| 2,006,637 | 7/1935 | Goldenberg | 36/67 R |
| 3,766,670 | 10/1973 | Nakajima | 36/67 B |
| 3,828,364 | 8/1974 | Aoyama | 36/67 B |
| 4,791,692 | 12/1988 | Collins | 12/142 P |

FOREIGN PATENT DOCUMENTS 337465 of 0000 Japan.

*Primary Examiner*—M. D. Patterson
*Attorney, Agent, or Firm*—Antonelli, Terry, Stout & Kraus, LLP

[57] ABSTRACT

A spike (10) for attachment to baseball shoes has a spike body (11), a leg (14) protruding upright from the spike body and having a distal edge (14a) and an abrasion-resistant tip (20) made of a metal and having a base portion welded to the distal edge of the leg. The base portion (21) has a wedge-shaped ridge (22) pressed to an end face of the distal edge such that the base portion (21) is gripped by and between masses of a once molten and then resolidified material of the distal edge of the leg, so that the spike is abrasion resistant and durable. The distal edge (14a) may have at its middle region a cutout (16) to divide the end face into two parts to which the base portion (21) of the tip are adjoined concurrently and in the same manner.

4 Claims, 5 Drawing Sheets

SPIKE FOR BASEBALL SHOES

BACKGROUND OF THE INVENTION

The present invention relates to a spike which is to be secured to the soles of baseball shoes.

It has been proposed to weld an abrasion-resistant and durable metal tip to the ground-engaging edge of an upright leg of the spike (see for instance Japanese Utility Model Publication No. 33-7465).

This prior art publication does however not teach any practical and feasible means for mass production of those spikes having such durable tips, thus failing to achieve commercial success.

SUMMARY OF THE INVENTION

The present invention was made in view of the deficiency in the prior proposal. An object of the present invention is therefore to provide a spike for baseball shoes, which spike comprises its leg having an edge that is resistance welded to an abrasion-resistant tip at a lowered mass production cost. Another object is to provide a means for securing the tip to said edge in such a manner as to ensure an extremely high weld strength and durability.

In order to achieve these objects, a spike proposed herein to be ready for attachment to baseball shoes does comprise a spike body, a leg protruding upright from the spike body and having a distal edge which in turn has an end face, with the spike further comprising an abrasion-resistant tip made of a metallic material and having a base portion confronting the end face. The base portion has a wedge-shaped ridge held in a tight contact with the end face of the distal edge to which the base portion of the tip is welded, wherein the base portion is embedded in the distal edge in such a state that the ridge and slopes continuing therefrom to vertical sides of the tip are covered with a material of the distal edge which is once molten and subsequently resolidifies while the tip is being welded to the spike body.

Preferably, the distal edge has at its middle region a cutout dividing the end face into two parts, and the wedge-shaped base portion of the tip is welded to both the parts. More desirably, the cutout may be V-shaped defining a shallow recess also forming the two parts so that the molten material flows towards the cutout and towards its bottom thereof before re-solidification while resistance welding is carried out whereby the resistant tip is welded over full length thereof to the distal edge of the leg.

THE PREFERRED EMBODIMENTS

Figure 1:
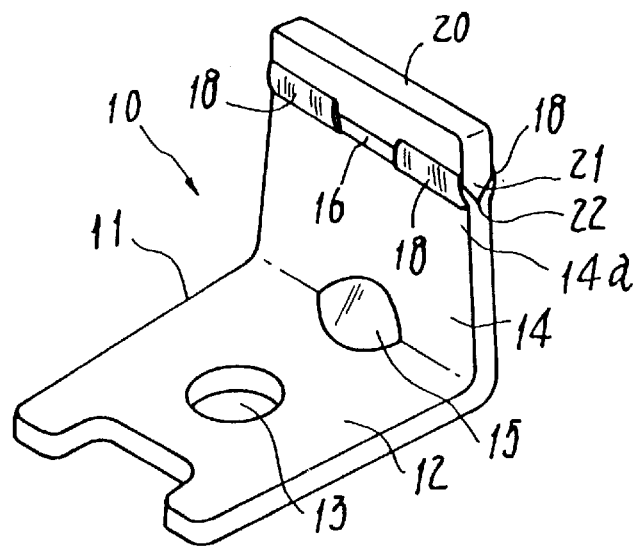
FIG. 1 is a perspective view of a spike for baseball shoes, with the spike being provided in a first embodiment of the present invention so as to have an abrasion-resistant tip made of a metal and secured to the end face of a leg that continues and protrudes upright from the body of said spike.

Now some embodiments of the present invention will be described referring to the drawing.

FIG. 1 shows a spike for baseball shoes 10 that comprises a spike body 11. This spike body may be prepared initially as a flat piece by punching a carbon steel plate easy to resistance weld to any other metallic articles, with the flat piece being subsequently bent into an L-shape. The spike body consists of a seat 12 and a leg 14 extending upright therefrom, with the seat having an aperture 13 serving as a fixing means. A reinforcement rib 15 is formed at a bent boundary between the seat 12 and leg 14. A distal edge 14a of this leg 14 has at its middle region a cutout 16 that will serve as a means for welding without failure a cemented carbide tip 20 to the end face of the distal edge, in such a manner as will be discussed below.

The spike 10 of the present invention is characterized in that the extremely hard and abrasion-resistant metal tip 20 formed of a cemented carbide (i.e., a hard alloy), is electrically resistance-welded to the distal edge 14a of the spike leg 14.

Figure 2:
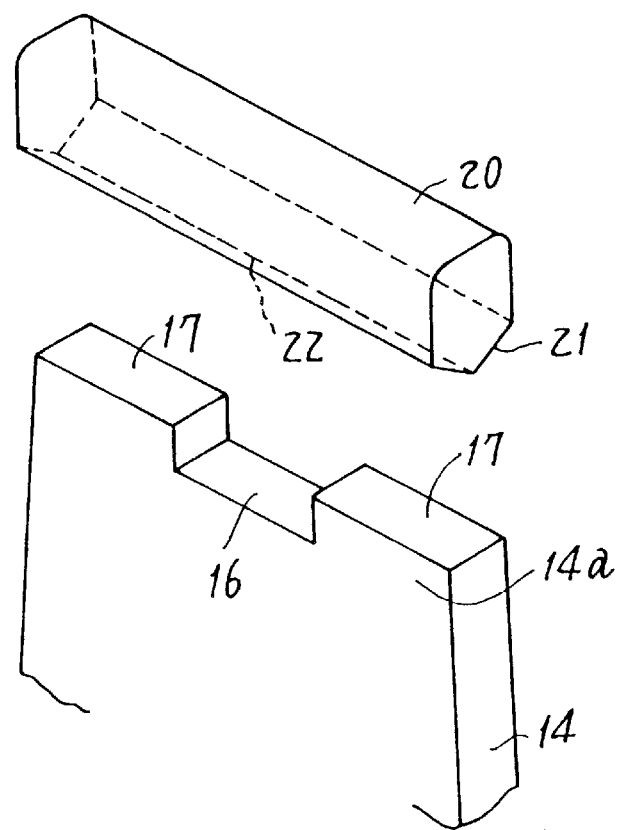
FIG. 2 is an exploded and enlarged perspective view of a principal part of the spike shown in FIG. 1.
Figure 3:
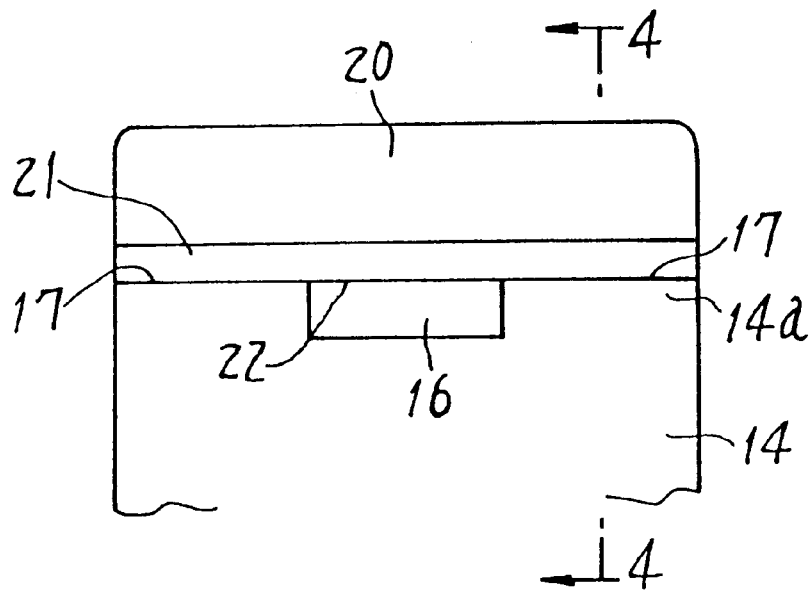
FIG. 3 is a front elevation of the abrasion-resistant tip that is made of a cemented carbide as the metal referred to above and held in a pressed contact with the end face of the leg for ready to be resistance welded thereto.
Figure 4:
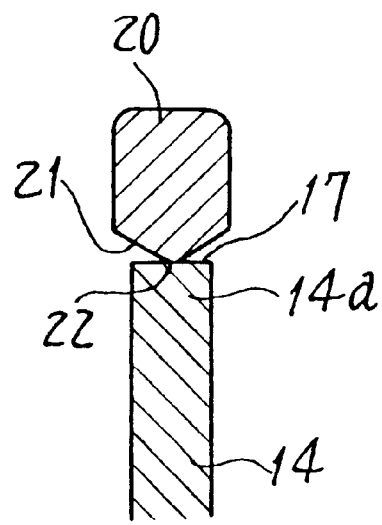
FIG. 4 is a cross section taken along the line 4—4 in FIG. 3.
Figure 5:
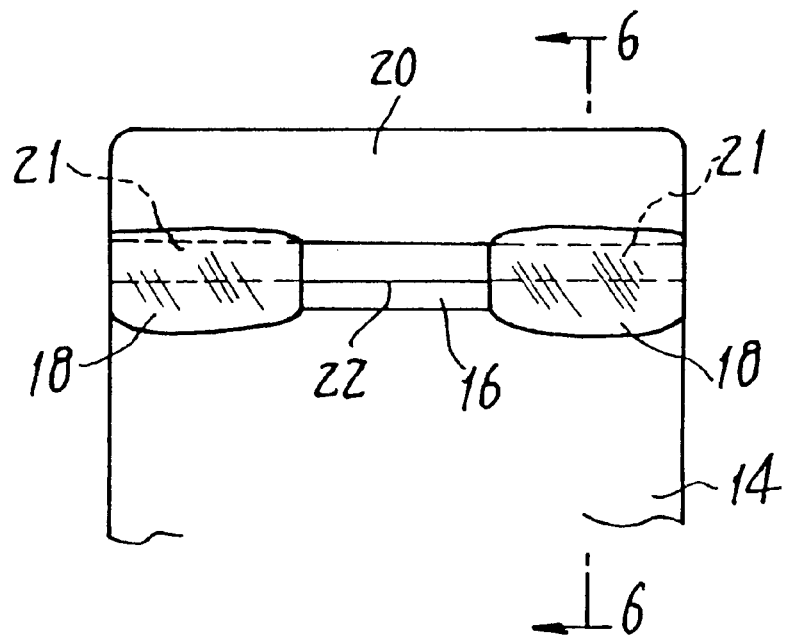
FIG. 5 is a front elevation of the abrasion-resistant tip shown in FIG. 3 and having been resistance welded to the end face of the leg.
Figure 6:
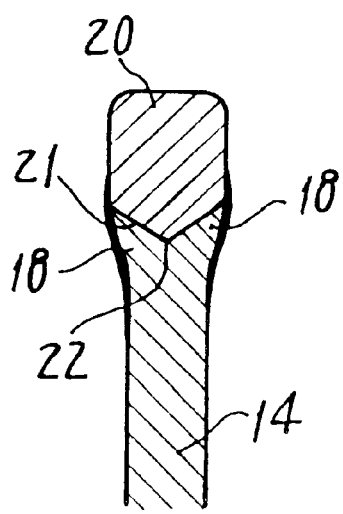
FIG. 6 is a cross section taken along the line 6—6 in FIG. 5.
Figure 7:
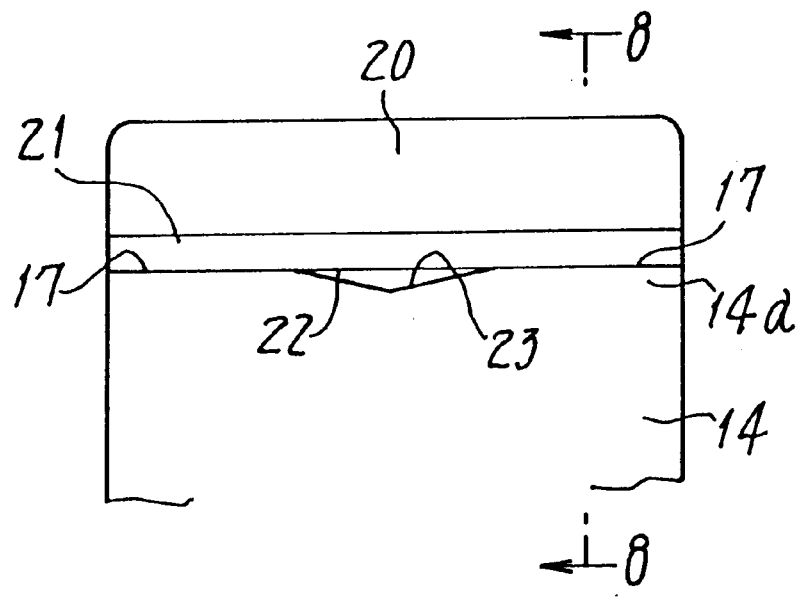
FIG. 7 is a front elevation of the abrasion-resistant tip that is also made of the cemented carbide and held in a pressed contact with the end face of the leg for ready to be resistance welded thereto, in accordance with a second embodiment.
Figure 8:
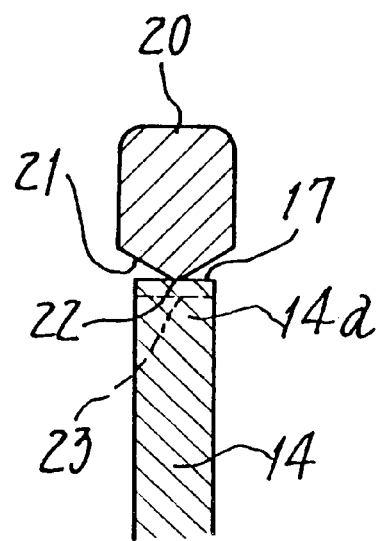
FIG. 8 is a cross section taken along the line 8—8 in FIG. 7.

Such a cemented carbide tip 20 is a rectangular and columnar small piece whose thickness is slightly greater than that of the leg, as seen in FIG. 2. A base portion 21 of this tip is wedge-shaped, and its ridge 22 is pressed to an end face 17 of the leg 14 to take a position shown in FIGS. 3 and 4 while resistance welding is carried out. As a result, the wedge-shaped base portion 21 having the ridge and slopes continuing therefrom is gripped (i.e., 'sandwiched') by and between opposite swelled masses of a once molten and then resolidified material of the distal edge of the leg, as illustrated in FIGS. 5 and 6. If the ridge 22 of the wedge-shaped base portion 21 of the tip 20 to be welded would be a perfectly straight line, then it can contact over its full length the leg's end face 17. Unfortunately, it is extremely difficult to prepare such an ideal ridge. Therefore, in many cases, only one of the regions (i.e., 'right-hand or left-hand' region in FIG. 3) will come into a partial contact with the end face 17 not having any cutout 16. In such an event, those mating portions of the spike body and the abrasion-resistant tip would often be welded together in a faulty manner. The cutout 16 involved in this embodiment is a rectangular and generally U-shaped recess that is of a substantially uniform depth. The cutout positioned at the middle region of leg's distal edge 14a is however effective to eliminate such a problem of defective welding. This effect may be attributed to a fact that the ridge 22 can contact both the regions of end face 17 divided by the middle cutout. At least both the right-hand and left-hand regions of the mating members are welded together in this manner so that the abrasion-resistant tip 20 is firmly gripped by and permanently secured to the swelled masses 18 of temporarily molten distal edge 14a of the spike body 11.

Figure 9:
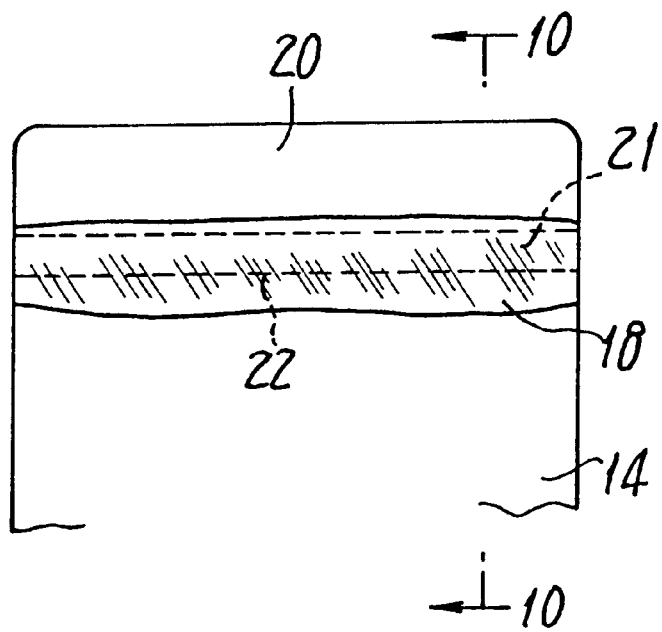
FIG. 9 is a front elevation of the abrasion-resistant tip shown in FIG. 7 and having been resistance welded to the end face of the leg.
Figure 10:
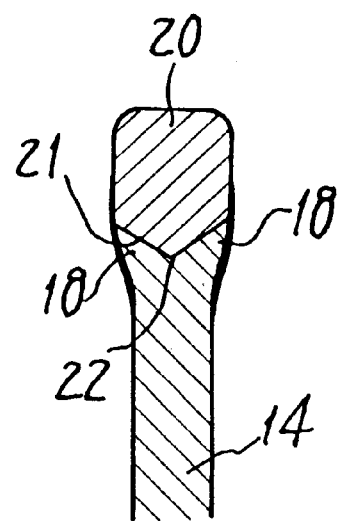
FIG. 10 is a cross section taken along the line 10—10 in FIG. 9.

FIGS. 7 to 10 show a second embodiment wherein the middle cutout 23 formed in the leg's distal edge 14a is substantially V-shaped and has an overall depth significantly smaller than that of the U-shaped one 16 described above in the first embodiment. The wedge-shaped base portion 21 of the tip 20 will, also in this case, bridge the right-hand and left-hand regions separated by the cutout 23 in the leg 14, and then be resistance welded thereto at an initial stage. However, as the welding process proceeds, the base portion will sink a certain distance into the molten mass formed of the leg's distal end 14a. The molten and consequently swelling mass 18 will slowly flow towards the center (i.e., bottom) of V-shaped cutout 23 to thereby extend the area where the welding takes place. Finally, the distal edge 14a of the spike leg 14 and the base portion 21 of the abrasion-resistant tip 20 are welded together over their full length. At the same time, the cavity defined by and in the cutout 23 will be filled with the molten mass 18 as seen in FIG. 9. The base portion 21 of tip 20 is thus embedded entirely in such a molten and then resolidifying mass 18, further improving weld strength after having cooled down.

In use, the spike 10 described above may be attached to the soles of baseball shoes, by means of a screw or the like not shown but fastened through the aperture 13, or by embedding the seat 12 in the sole.

The abrasion-resistant tip 20 and the spike leg 14 somewhat thinner than the tip in the above embodiments may however be of the same thickness, if necessary or so desired. Any abrasion-resistant metallic material other than the cemented carbide may be employed to form the tip 20.

In summary, the present invention provides a spike that comprises an abrasion-resistant tip having a wedge-shaped base portion and a ridge thereof resistance welded to a distal edge of the leg protruding upright from the spike body. The tip's base portion is adjoined to said leg in such a state that the material forming said edge, molten once and then resolidified does grip the base portion at its opposite sides. The spike thus has an excellent resistance to abrasion due to the firmly secured tip, which tip can durably withstand a bending stress applied to the leg's distal edge, so that it is no longer necessary to replace the spike in use with a new one.

The structure as defined and proposed in the accompanying claims 2 or 3 will furthermore improve the weld strength of the tip adjoined to the spike leg.

What we claim is:

1. A process for manufacturing a spike for attachment to baseball shoes, comprising:

providing a spike body having a leg protruding upright, the leg having a distal edge having a flat end face;

providing an abrasion resistant tip made of a metal and having a base portion including a wedge-shaped ridge and sloped sides extending between the ridge and vertical sides of the tip;

pressing the wedge-shaped ridge to the end face of the distal edge of the leg; and welding the tip to the leg, whereby a material of the distal edge becomes molten, the ridge embeds into the end face of the distal edge and the material of the distal edge which is once molten covers and resolidifies over the ridge and the slopes of the base portion of the tip.

2. A process as defined in claim 1, wherein the distal edge of the leg has at its middle region a cutout dividing the end face into two parts, and the wedge-shaped base portion of the tip is welded to both the parts.

3. A process as defined in claim 1, wherein the cutout is V-shaped defining a shallow central valley forming two parts so that the once molten material flows towards the cutout and towards a bottom thereof before re-solidification of the material while resistance welding is carried out whereby the abrasion-resistant tip is welded over fill length thereof to the distal edge of the leg.

4. A process as defined in claim 1, wherein the tip is formed of a cemented carbide.

\* \* \* \* \*